Oct. 19, 1926.  1,603,562
H. W. TAYLOR
HOG SPREADER
Filed Jan. 21, 1926   2 Sheets-Sheet 1
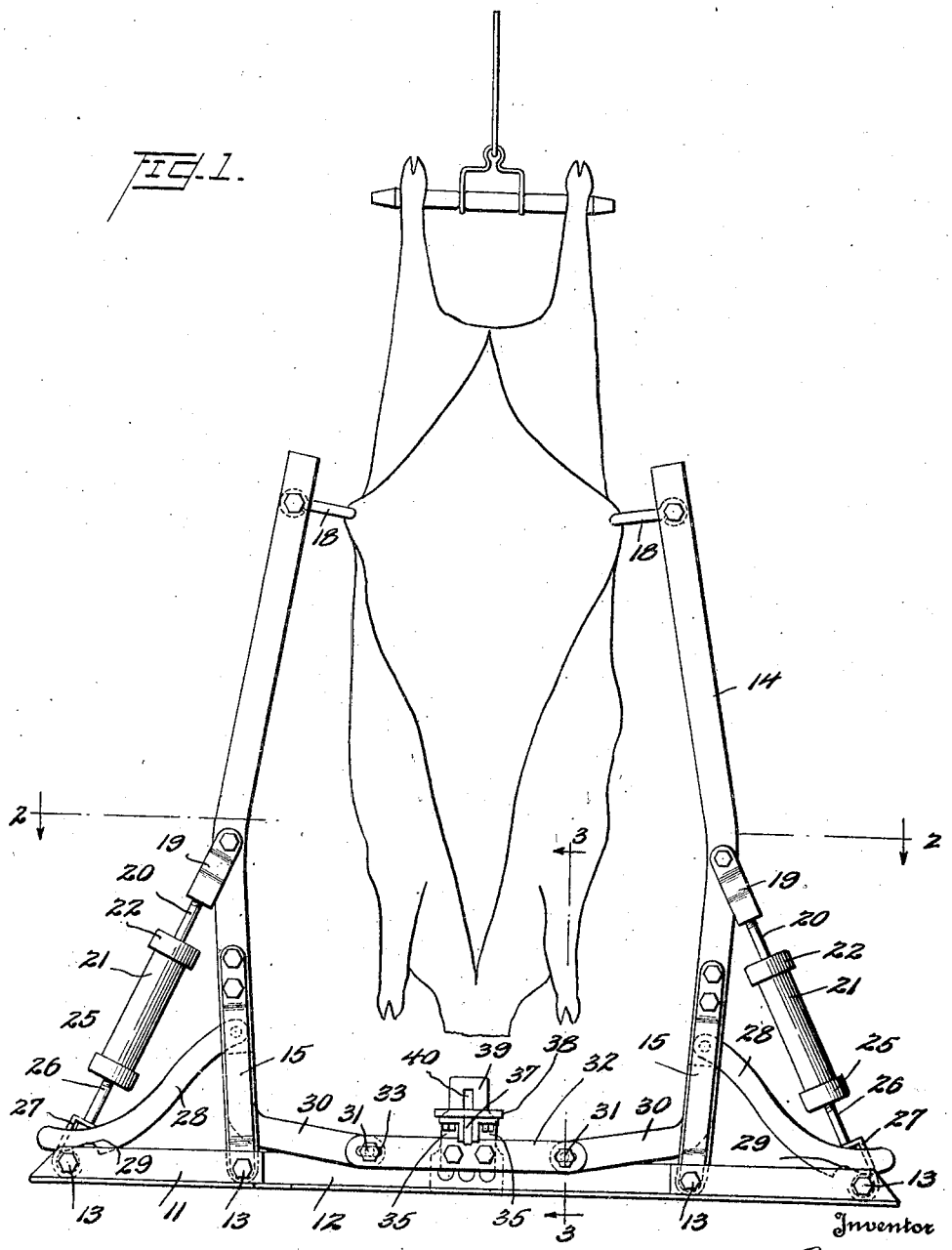

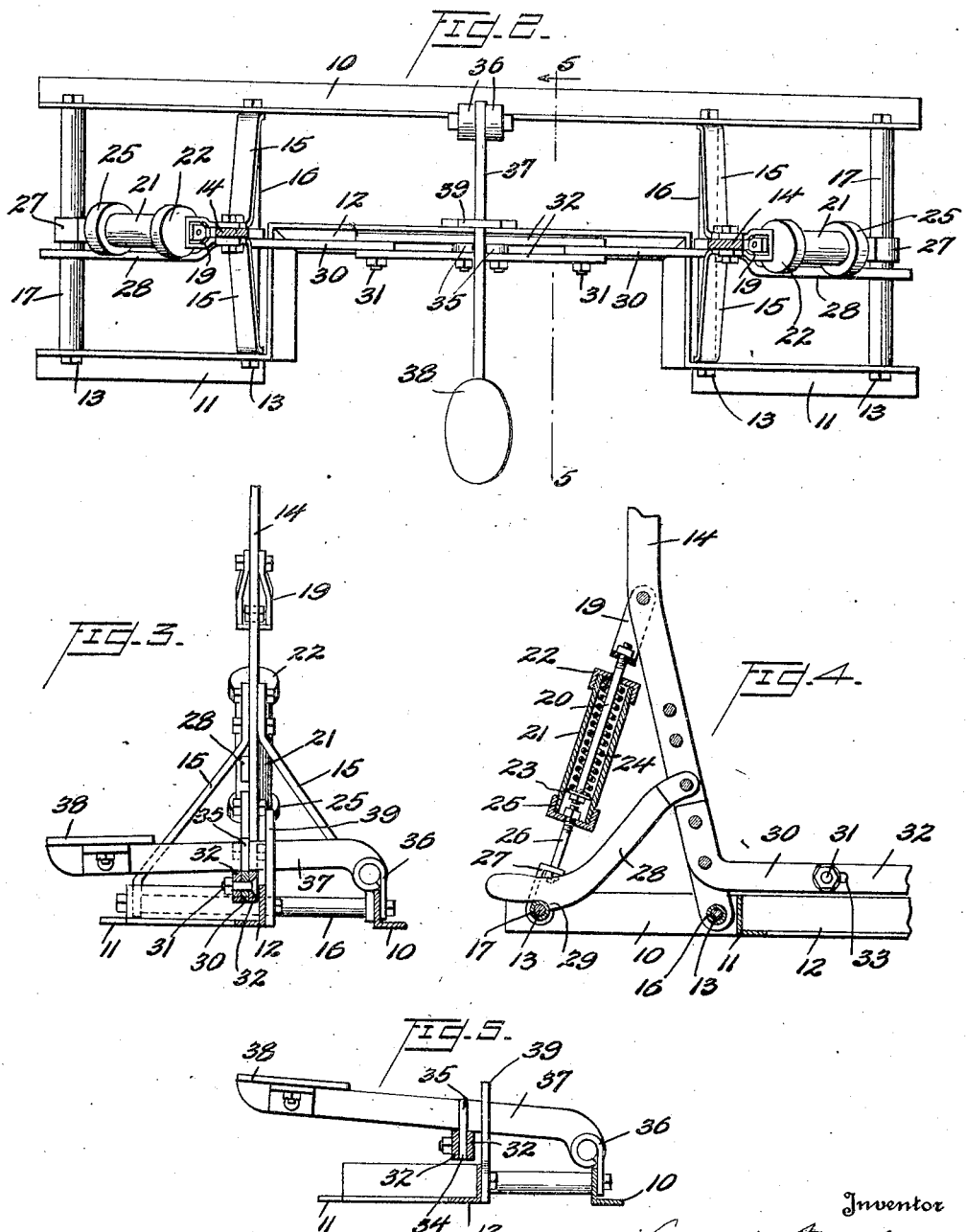

Patented Oct. 19, 1926.

1,603,562

UNITED STATES PATENT OFFICE.

HENRY W. TAYLOR, OF ASHLAND, KENTUCKY.

HOG SPREADER.

Application filed January 21, 1926. Serial No. 82,715.

The first step in cutting up a hog carcass is to halve it by splitting the back bone. The carcass is suspended during this operation, and formerly it was the custom to block the sides apart by means of sticks, which latter, however, interfered considerably with the splitting operation. It is now the usual practice for two men to hold the sides apart while a third does the splitting.

The purpose of my invention is to permit the splitting operation to be carried out quickly and conveniently by one operator. In the preferred form of my invention, I provide means for engaging the carcass at the sides of the longitudinal slit which is made in dressing the carcass, and spring means for forcing and holding such engaging means apart, so that ready access to the interior is provided. The accompanying drawings illustrate such an embodiment, and in them Figure 1 is a side elevation of my device showing it in operative relation to a suspended carcass.

Figure 2 is a section on the line 2—2 of Figure 1.

Figure 3 is a section on the line 3—3 of Figure 1.

Figure 4 is a view of Figure 3 looking from the left, parts being shown in section, and Figure 5 is a view on the line 5—5 of Figure 2.

The apparatus as a whole is supported upon a base consisting of frame members 10 and 11, Figure 2. As will be seen the central portion 12 of member 11 is set off in the direction of member 10, and the two members are connected by means of bolts 13. Pivoted at the middle of inner bolts 13 are the upright arms 14 and braces 15 are bolted to these arms near their lower ends, the lower ends of these braces having bores through which the inner bolts 13 pass. It will be evident that the arms 14 may thus be freely swung towards and away from each other while the braces 15 serve to give them lateral stability. In order to hold frame elements 10 and 11 in proper spaced relation collars 16 are interposed between the ends of the braces and the ends of the arms on inner bolts 13 and collars 17 are provided on outer bolts 13.

The upper end of each arm 14 is provided with a hook 18 adapted to engage the carcass in the manner mentioned above. For the purpose of forcing the arms apart, I interpose spring means between the arms and the base. Referring particularly to Figure 4 a clevis 19 is pivoted to each arm and a bolt 20 engages in this clevis and extends into a cylinder 21 through cap 22 so as to slide freely in the latter. The end of the bolt is provided with a washer 23 and between this washer 23 and cap 22 is interposed a compression spring 24. Cap 25 of the cylinder 21 is engaged by bolt 26 which at its other end engages a hook member 27 which engages around collar 17. In order to limit the outward movement of arms 15 under the influence of their respective spring elements, I attach pivotally to each arm a stop member 28 having a shoulder 29 adapted to bear against sleeve 17.

If greater movement of the arms is desired than is permitted by stop member 28, the latter can be lifted so that its shoulder 29 will ride on top of member 17.

Assuming the stop members to be operative, however, arms 14 will normally take the position shown in Fig. 1.

In order to converge the engaging members 18 at the commencement of the operation, I have provided the following mechanism:

Each arm 14 has at its lower end an angular member 30 rigidly secured thereto. The angular arms of these members extend inwardly as may be clearly seen from Figures 1 and 4, and at their ends carry cross bolts 31. Links 32, in Figure 2, have end slots 33, Figures 1 and 4, which engage the shanks of bolts 31, one link being disposed at each side of a member 30. At the center of these slide links is a spacing member 34 having vertical, spaced fingers 35. Directly to the rear of these fingers are stanchions 36 fixed to the frame element 10 and a lever 37 having a foot rest 38 is pivoted between these stanchions and rests on links 32 between fingers 35. A guide member 39 fixed to section 12 has a slot 40 in which lever 37 is guided, the upward movement of the lever being limited by the top portion of member 39.

Upon applying downward pressure to pedal 38 projections 30 are forced downwardly and arms 14 are forced inwardly against the action of their respective spring elements. I have found the described gear for effecting this movement of the arms most efficient since it may be disposed entirely at the bottom of the apparatus so as to be quite out of the way.

From the above description of my improved device its operation will be perfectly obvious. It will also be evident that the spreader will be useful during the dressing operation as well as during the splitting operation. The carcass may even be engaged by the hooks at either side of a cut to be made, thus holding the hide taut. Other uses in the art may also be found for my improved device.

While I have described a particular embodiment of my invention, it is to be understood that I do not intend to be limited thereby, but the breadth of my invention is to be construed from the following claims.

I claim:

1. Apparatus of the class described, comprising means for engaging a carcass at the sides of a slit, means supporting said engaging means to permit relative convergent and divergent movements of the latter, a lever in connection with said supporting means and adapted upon actuation to impart relative movement of one order to said engaging means, and spring means adapted upon release of said lever to impart relative movement of the other order to said engaging means.

2. Apparatus of the class described, comprising means for engaging a carcass at the sides of a slit, means supporting said engaging means to permit relative convergent and divergent movements of the latter, link means connecting said supporting means, whereby pressure being applied to said link means a relative movement of one order is imparted to said engaging means, and spring means in connection with said supporting means adapted upon release of said link means to impart a relative movement of the other order to said engaging means.

3. Apparatus of the class described, comprising means for engaging a carcass at the sides of a longitudinal slit, spring means forcing said engaging means apart, and means for converging said engaging means against the force of said spring means.

4. Apparatus of the class described, comprising means for engaging a suspended carcass at the sides of a longitudinal slit, upright arms attached to said engaging means, a base to which said arms are pivoted, spring means forcing said arms apart, and positive means adapted to converge said arms against the action of said spring means.

5. Apparatus of the class described, comprising means for engaging a suspended carcass at the sides of a longitudinal slit, upright arms attached to said engaging means, a base to which said arms are pivoted, link means connecting said arms whereby pressure being applied to said link means said arms are converged, and springs interposed between said base and respective arms tending to force the latter apart.

6. Apparatus of the class described, comprising means for engaging a suspended carcass at the sides of a longitudinal slit, upright arms attached to said engaging means, a base to which said arms are pivoted, link means connecting said arms, a pedal whereby pressure may be applied to said link for converging said arms, springs interposed between said base and respective arms tending to force the latter apart, and releasable blocking means for limiting the movement of said arms apart.

7. Apparatus of the class described, comprising means for engaging a suspended carcass at the sides of a longitudinal slit, upright arms attached to said engaging means, a base to which said arms are pivoted, inward projections on said arms, a slide link connecting said projections, whereby pressure being applied to said link, said arms are converged, and springs interposed between said base and respective arms tending to force the latter apart.

8. Apparatus of the class described, comprising means engaging a carcass at the sides of an incision, spring means urging said engaging means apart for opening the incision, and releasable means normally limiting the movement apart of said engaging means.

In testimony whereof I have hereunto set my hand.

HENRY W. TAYLOR.